No. 741,046. PATENTED OCT. 13, 1903.
J. KIRSCHBAUM.
MAKING SHEET METAL WARE.
APPLICATION FILED AUG. 14, 1902.
NO MODEL.
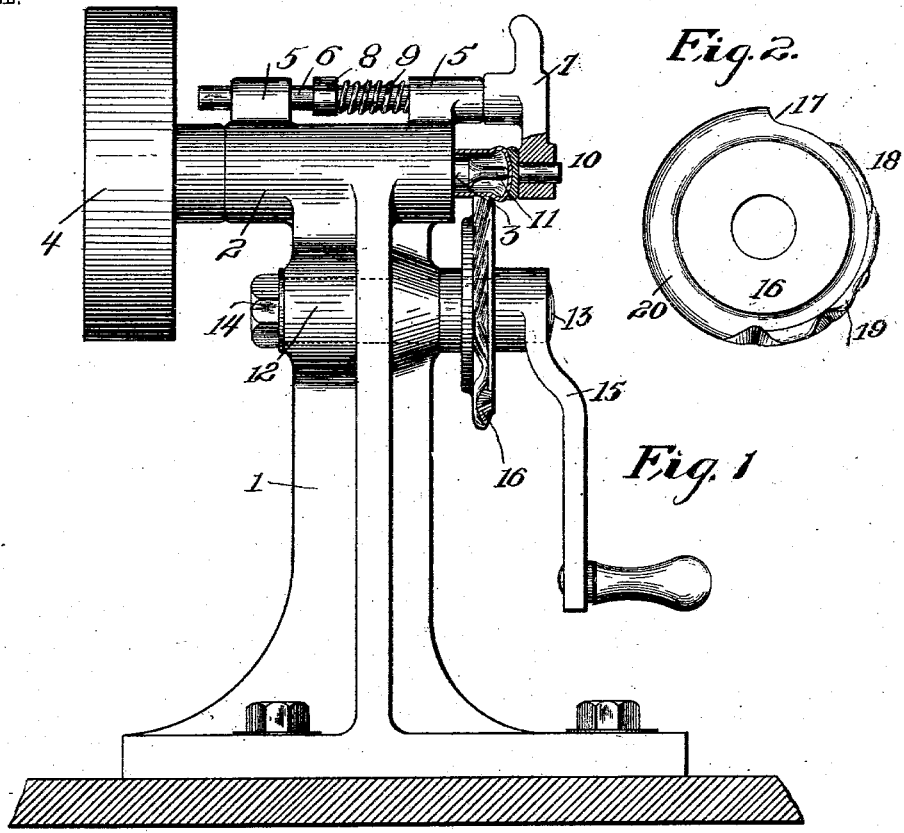
Witnesses:
Calderon C Fuss
Dr. Ralph Julian Sachers
Inventor:
J. Kirschbaum
By his Attorney
F. H. Richards
THE NORRIS PETERS CO., PHOTO-LITHO., WASHINGTON, D. C.

No. 741,046.

Patented October 13, 1903.

UNITED STATES PATENT OFFICE.

JOHN KIRSCHBAUM, OF WATERBURY, CONNECTICUT, ASSIGNOR OF ONE-HALF TO THE NOVELTY MFG. CO., OF WATERBURY, CONNECTICUT, A CORPORATION OF CONNECTICUT.

MAKING SHEET-METAL WARE.

SPECIFICATION forming part of Letters Patent No. 741,046, dated October 13, 1903.

Application filed August 14, 1902. Serial No. 119,607. (No model.)

*To all whom it may concern:*

Be it known that I, JOHN KIRSCHBAUM, a citizen of the United States, residing in Waterbury, in the county of New Haven and State of Connecticut, have invented certain new and useful Improvements in Making Sheet-Metal Ware, of which the following is a specification.

The present invention relates to an improvement in making sheet-metal ware, and especially to machines for making metal articles by spinning.

In machines heretofore in use the burnisher or molding-tool was held by hand or on the lathe-rest and its working part brought into contact with and pressed against the sheet metal rotating on and with the mold or chuck of the lathe. This arrangement necessitated great skill of the operator and the application of great force in forming the article. The molding-tool had to be changed quite frequently, according to the desired change in the shape of the article, and although this change of the tool and the time required to make this change does not appear to be of great importance in the manufacture of larger articles it undoubtedly is of greatest importance in the manufacture of small ware, such as buttons, ferrules, &c., which have to be made in large numbers.

One of the objects of the present invention, therefore, is to provide a machine in which the changing from one molding-tool to a different one is accomplished in a most simple and efficient manner.

Another object is to make this change of molding-tools or burnishers in a predetermined order of succession, according to the different successive steps in shaping the article.

Another object is to provide in one tool having portions of different configuration a substitute for a plurality of molding-tools and arrange the same at a desired distance from the axis of the article to be manufactured, insuring thereby pressure of great uniformity during the different steps of the operation.

Other objects within the scope of the present invention may appear hereinafter and will be more fully specified and described.

In carrying out the invention a substantially disk-shaped tool having portions of different configuration on its circumference is arranged at a predetermined distance from the rotating chuck carrying thereon the piece of sheet metal to be shaped and is brought in operation by simply rotating the tool and bringing its portions of different configuration successively in a prearranged order in contact with the sheet metal to be spun.

The drawings accompanying the present application and forming a part thereof illustrate the invention in its preferred form.

Figure 1 is a side elevation of the complete device. Fig. 2 is a side view of the molding-tool or burnisher. Fig. 3 illustrates the developed circumference of this tool, showing the portions of different configuration. Figs. 4 to 10 are side views of an article made with this device, showing the results of successive steps of operation.

1 in Fig. 1 is a frame or support having at its upper end a bearing 2 for receiving a spindle 3, which may be rotated at a high rate of speed by any suitable means, such a pulley 4. The working end or arbor-chuck 11 of said spindle may be shaped according to the requirements of the work to be done thereon. In said bearing and preferably on top thereof are means for holding the working piece against the chuck 11. These means, although capable of being constructed in a variety of ways, are shown in the present case to consist of bearings 5, containing a rod 6, provided with a finger-piece 7 and having a bearing for a counter-chuck 10.

The rod 6 is provided with a collar 8 and a spiral spring 9 for holding the counter-chuck 10 under tension toward the work-piece, held between the same and the arbor-chuck 11. The counter-chuck 10 is rotatable in its bearing, and therefore rotates by means of and with the work-piece. The support 1 is furthermore provided with a second bearing 12, containing a spindle 13, having a washer and a screw 14 at one end thereof. This spindle rotates in its bearing by means of a crank 15 or similar device and holds keyed thereon and rotating with it the molding-tool or burnisher 16. This molding-tool (illustrated in one of its forms in Fig. 2) is preferably disk-shaped, and its periphery shows portions of different configuration, as at 17 18 19 in Figs. 2 and 3. The configuration is derived and taken from differently-shaped tools and from the angle under which they are held toward and pressed against the work-piece, according to the different shape of the work-piece during successive steps of operation in manufacturing the same. The order of arranging these portions of different configuration on the circumference of the disk 16 depends upon the order of those successive steps of operation in forming the article.

The operation of the device is as follows: A preshaped work-piece, such as shown in Fig. 4, is placed on the arbor-chuck 11 and held thereon by means of the counter-chuck 10. The same is rotated at a high rate of speed. The working tool 16 is in its initial position—i. e., with the portion 17 near the work-piece. If now the working tool is rotated by means of the crank 15, the different portions 17 18, &c., of its circumference will successively come in contact with and operate upon this work-piece until the long portion 20 imparts to it the final shape shown in Fig. 10, whereafter the molding-tool 16 is brought again in its initial position, which allows the removal of the finished article and the insertion of a new preshaped work-piece.

It is obvious that various changes may be made in the details of construction and the method of arrangement to suit different classes of work without departing from the spirit of my invention.

Having described my invention, I claim—

1. In a machine for spinning sheet-metal ware, the combination with a rotatable spindle adapted to hold and rotate the work, of a spinning-tool mounted in proximity to said spindle to move in the plane of rotation of said spindle, said spinning-tool provided with a rib diagonally of the direction of movement of said tool, said rib adapted to contact the work, the contact of the said rib with the work moving laterally across the work with the movement of said tool.

2. In a machine for spinning sheet-metal ware, the combination with a rotatable spindle adapted to hold and rotate the work, of a drum mounted in proximity to said spindle and to rotate in the plane of rotation of said spindle, said drum provided with a peripheral rib running diagonally of the axis of said drum, said rib adapted to contact with the work, the contact of said rib with the work moving laterally across the work with the rotation of said drum.

3. In a machine for spinning sheet-metal ware, the combination with a rotatable spindle adapted to hold and rotate the work, of a rotatable spinning-tool consisting of a drum mounted to rotate in the plane of rotation of said spindle and having a spiral, peripheral rib adapted to contact with the work, the contact of said spiral rib with the work moving laterally across the work upon the rotation of said drum.

4. In a machine for spinning sheet-metal ware, the combination with a rotatable spindle adapted to hold and rotate the work, of a spinning-tool consisting of a drum mounted in proximity to said spindle to rotate in the plane of rotation of said spindle and having a peripheral rib running diagonally of the axis of said drum, said rib adapted to contact with the work, said contact moving laterally across the work upon the rotation of said drum, the several portions of the crest of said rib being of heights corresponding to the conformation of those respective portions of the finished work contacted by said several portions.

5. In a machine for spinning sheet-metal ware, the combination with a rotatable spindle adapted to hold and rotate the work, of a spinning-tool mounted in proximity to said spindle and movable in the plane of rotation of said spindle, said spinning-tool provided with a plurality of ribs diagonally of the direction of movement of said spinning-tool and of successively-increasing heights, said ribs adapted to successively contact with the work, the points of contact of said ribs with the work moving laterally across the work with the movement of said spinning-tool.

6. In a machine for spinning sheet-metal ware, the combination with a rotatable spindle adapted to hold and rotate the work, of a rotatable spinning-tool consisting of a drum mounted in proximity to the work and rotatable in the plane of rotation of said spindle, and provided with a plurality of peripheral ribs of successively-increasing heights running diagonally of said drum, said ribs adapted to successively contact with the work, the points of contact of said ribs with the work moving laterally across the work with the rotation of said drum.

7. In a machine for spinning sheet-metal ware, the combination with a rotatable spindle adapted to hold and rotate the work, of a spinning-tool mounted in proximity to said spindle to move in the plane of rotation of said spindle, said spinning-tool provided with a plurality of peripheral ribs running diagonally of the direction of movement of said spinning-tool in both directions and of successively-increasing heights, said ribs adapted to successively contact with the work, the points of contact of said ribs with the work moving laterally in both directions across the work with the movement of said spinning-tool in one direction only.

8. In a machine for spinning sheet-metal ware, the combination with a rotatable spindle adapted to hold and rotate the work, of a spinning-tool mounted in proximity to said spindle to move in a plane of rotation of said spindle, said spinning-tool provided with a rib diagonally of the direction of movement of said tool, said rib adapted to contact with the work, the contact of the said rib with the work moving laterally across the work with the movement of said tool, and a burnishing-surface succeeding said rib and running in the direction of movement of said tool, said burnishing-surface conforming to the contour of the finished work.

In testimony whereof I have hereunto set my hand, in the presence of two subscribing witnesses, this 12th day of August, 1902.

JOHN KIRSCHBAUM.

In presence of—
 RALPH JULIAN SACHERS,
 ANNA R. ABELING.